(12) United States Patent
Glasco et al.

(10) Patent No.: US 8,607,008 B1
(45) Date of Patent: Dec. 10, 2013

(54) SYSTEM AND METHOD FOR INDEPENDENT INVALIDATION ON A PER ENGINE BASIS

(75) Inventors: David B. Glasco, Austin, TX (US); Lingfeng Yuan, Palo Alto, CA (US)

(73) Assignee: NVIDIA Corporation, Santa Clara, CA (US)

(*) Notice: Subject to any disclaimer, the term of this patent is extended or adjusted under 35 U.S.C. 154(b) by 382 days.

(21) Appl. No.: 11/591,629

(22) Filed: Nov. 1, 2006

(51) Int. Cl.
*G06F 12/00* (2006.01)

(52) U.S. Cl.
USPC ............ 711/159; 711/147; 711/148; 711/153

(58) Field of Classification Search
USPC ................................... 711/147, 148, 153, 159
See application file for complete search history.

(56) References Cited

U.S. PATENT DOCUMENTS

| | | | |
|---|---|---|---|
| 3,815,101 A | 6/1974 | Boss et al. | |
| 3,950,729 A | 4/1976 | Fletcher et al. | |
| 4,654,790 A | 3/1987 | Woffinden | |
| 4,797,814 A | 1/1989 | Brenza | |
| 4,812,981 A | 3/1989 | Chan et al. | |
| 5,123,094 A | 6/1992 | MacDougall | |
| 5,179,669 A * | 1/1993 | Peters ........................... | 710/317 |
| 5,245,702 A | 9/1993 | McIntyre et al. | |
| 5,278,962 A | 1/1994 | Masuda et al. | |
| 5,414,824 A | 5/1995 | Grochowski | |
| 5,446,854 A | 8/1995 | Khalidi et al. | |
| 5,526,504 A | 6/1996 | Hsu et al. | |
| 5,649,102 A | 7/1997 | Yamauchi et al. | |
| 5,649,184 A | 7/1997 | Hayashi et al. | |
| 5,696,925 A | 12/1997 | Koh | |
| 5,949,785 A * | 9/1999 | Beasley ........................ | 370/398 |
| 5,963,984 A | 10/1999 | Garibay, Jr. et al. | |
| 5,999,189 A | 12/1999 | Kajiya et al. | |
| 6,012,132 A | 1/2000 | Yamada et al. | |
| 6,297,832 B1 | 10/2001 | Mizuyabu et al. | |
| 6,298,390 B1 | 10/2001 | Matena et al. | |
| 6,362,826 B1 | 3/2002 | Doyle et al. | |
| 6,457,115 B1 | 9/2002 | McGrath | |
| 6,470,428 B1 | 10/2002 | Milway et al. | |
| 6,499,090 B1 | 12/2002 | Hill et al. | |
| 6,549,997 B2 | 4/2003 | Kalyanasundharam | |
| 6,636,223 B1 | 10/2003 | Morein | |
| 6,658,538 B2 | 12/2003 | Arimilli et al. | |

(Continued)

FOREIGN PATENT DOCUMENTS

| | | |
|---|---|---|
| JP | 02288927 | 11/1990 |
| JP | 03054660 | 3/1991 |
| JP | 04182858 | 6/1992 |

OTHER PUBLICATIONS

Harper et al., (Rapid recovery from transient Faults in the fault tolerant processor with fault-tolerant shared memory) 1990, IEEE, p. 350-359.

(Continued)

*Primary Examiner* — Mardochee Chery (57) ABSTRACT

A shared resource management system and method are described. In one embodiment a shared resource management system includes a plurality of engines, a shared resource, and a shared resource management unit. In one exemplary implementation the shared resource is a memory and the shared resource management unit is a memory management unit (MMU). The plurality of engines perform processing. The shared resource supports the processing. For example a memory store information and instructions for the engines. The shared resource management unit independently caches and invalidates page table entries on a per engine basis.

20 Claims, 7 Drawing Sheets

(56) References Cited

U.S. PATENT DOCUMENTS

| | | | |
|---|---|---|---|
| 6,742,104 B2 | 5/2004 | Chauvel et al. | |
| 6,813,699 B1 | 11/2004 | Belgard | |
| 6,823,433 B1 | 11/2004 | Barnes et al. | |
| 6,839,813 B2 | 1/2005 | Chauvel | |
| 6,859,208 B1* | 2/2005 | White | 345/557 |
| 6,877,077 B2 | 4/2005 | McGee et al. | |
| 6,883,079 B1 | 4/2005 | Priborsky | |
| 7,007,075 B1 | 2/2006 | Coffey | |
| 7,082,508 B2 | 7/2006 | Khan et al. | |
| 7,107,411 B2 | 9/2006 | Burton et al. | |
| 7,107,441 B2 | 9/2006 | Zimmer et al. | |
| 7,120,715 B2 | 10/2006 | Chauvel et al. | |
| 7,159,095 B2 | 1/2007 | Dale et al. | |
| 7,194,597 B2 | 3/2007 | Willis et al. | |
| 7,234,038 B1* | 6/2007 | Durrant | 711/203 |
| 7,275,246 B1 | 9/2007 | Yates, Jr. et al. | |
| 7,401,358 B1 | 7/2008 | Christie et al. | |
| 7,447,869 B2 | 11/2008 | Kruger et al. | |
| 7,469,273 B2 | 12/2008 | Anderson et al. | |
| 7,519,781 B1 | 4/2009 | Wilt | |
| 7,545,382 B1 | 6/2009 | Montrym et al. | |
| 7,716,673 B2 | 5/2010 | Chauvel et al. | |
| 7,730,489 B1 | 6/2010 | Duvur et al. | |
| 2002/0004823 A1* | 1/2002 | Anderson et al. | 709/208 |
| 2002/0013889 A1 | 1/2002 | Schuster et al. | |
| 2002/0169938 A1 | 11/2002 | Scott et al. | |
| 2002/0172199 A1 | 11/2002 | Scott et al. | |
| 2003/0014609 A1 | 1/2003 | Kissell | |
| 2003/0167420 A1 | 9/2003 | Parsons | |
| 2003/0196066 A1 | 10/2003 | Mathews | |
| 2003/0236771 A1 | 12/2003 | Becker | |
| 2004/0025161 A1* | 2/2004 | Chauvel et al. | 718/102 |
| 2004/0054833 A1 | 3/2004 | Seal et al. | |
| 2004/0078778 A1 | 4/2004 | Leymann et al. | |
| 2004/0153350 A1 | 8/2004 | Kim et al. | |
| 2004/0193831 A1 | 9/2004 | Moyer | |
| 2004/0215918 A1 | 10/2004 | Jacobs et al. | |
| 2004/0268071 A1 | 12/2004 | Khan et al. | |
| 2005/0050013 A1 | 3/2005 | Ferlitsch | |
| 2005/0097280 A1 | 5/2005 | Hofstee et al. | |
| 2005/0268067 A1 | 12/2005 | Lee et al. | |
| 2006/0004984 A1 | 1/2006 | Morris et al. | |
| 2006/0069879 A1 | 3/2006 | Inoue et al. | |
| 2006/0069899 A1 | 3/2006 | Schoinas et al. | |
| 2006/0187945 A1 | 8/2006 | Andersen | |
| 2006/0195683 A1 | 8/2006 | Kissell | |
| 2006/0230223 A1 | 10/2006 | Kruger et al. | |
| 2006/0259732 A1 | 11/2006 | Traut et al. | |
| 2006/0259825 A1 | 11/2006 | Cruickshank et al. | |
| 2006/0282645 A1 | 12/2006 | Tsien | |
| 2006/0288174 A1 | 12/2006 | Nace et al. | |
| 2007/0067505 A1* | 3/2007 | Kaniyur et al. | 710/22 |
| 2007/0073996 A1 | 3/2007 | Kruger et al. | |
| 2007/0106874 A1 | 5/2007 | Pan et al. | |
| 2007/0126756 A1 | 6/2007 | Glasco et al. | |
| 2007/0157001 A1 | 7/2007 | Ritzau | |
| 2007/0168634 A1 | 7/2007 | Morishita et al. | |
| 2007/0168643 A1 | 7/2007 | Hummel et al. | |
| 2008/0263284 A1 | 10/2008 | da Silva et al. | |

OTHER PUBLICATIONS

PCMAG (Definition of: Page fault) PCMag, 1.
Wikipedia, (Page Fault definition) Wikipedia, 1-4.
Osronline, (The Basics: So what is a page fault?) May 3, p. 1-2.
Final Office Action; Mail Date Nov. 20, 2009; U.S. Appl. No. 11/591,685.
Non-Final OA Dated May 28, 2009; U.S. Appl. No. 11/523,830.
Non-Final OA Dated Sep. 15, 2008; U.S. Appl. No. 11/523,830.
Non-Final OA Dated Jan. 20, 2010; U.S. Appl. No. 11/586,756.
Final OA Dated Jun. 4, 2009; U.S. Appl. No. 11/586,756.
Non-Final OA Dated Nov. 18, 2008; U.S. Appl. No. 11/586,756.
Non Final OA Dated Aug. 19, 2009; U.S. Appl. No. 11/591,857.
Restriction Requirement Dated Apr. 27, 2009; U.S. Appl. No. 11/591,857.
Restriction Requirement; Mail Date Apr. 28, 2009; U.S. Appl. No. 11/592,076.
Non-Final OA Dated Oct. 29, 2008; U.S. Appl. No. 11/523,950.
Notice of Allowance Dated Dec. 24, 2009; U.S. Appl. No. 11/523,950.
Notice of Allowance Dated Sep. 3, 2009; U.S. Appl. No. 11/523,950.
Non-Final OA Dated Dec. 16, 2008; U.S. Appl. No. 11/586,826.
Non-Final OA Dated Feb. 17, 2009; U.S. Appl. No. 11/592,819.
Final Office Action, Dated Nov. 23, 2009; U.S. Appl. No. 11/592,106.
Non Final Office Action, Dated Apr. 1, 2009; U.S. Appl. No. 11/592,106.
Final OA Dated Nov. 24, 2009; U.S. Appl. No. 11/592,780.
Non-Final OA Dated Apr. 2, 2009; U.S. Appl. No. 11/592,780.
Non-Final OA Dated Sep. 24, 2009; U.S. Appl. No. 11/588,177.
Final OA Dated May 21, 2009; U.S. Appl. No. 11/588,177.
Non-Final OA Dated Nov. 13, 2008; U.S. Appl. No. 11/588,177.
Final OA Dated Dec. 8, 2009; U.S. Appl. No. 11/591,856.
Non-Final OA Dated May 11, 2009; U.S. Appl. No. 11/591,856.
Final OA Dated Oct. 14, 2009; U.S. Appl. No. 11/586,825.
Non-Final OA Dated Mar. 18, 2009; U.S. Appl. No. 11/586,825.
Non Final Office Action; Mail Date Apr. 27, 2009; U.S. Appl. No. 11/591,685.
Notice of Allowance; Mail Date Jan. 29, 2010; U.S. Appl. No. 11/592,076.
Final Office Action; Mail Date Mar. 16, 2010; U.S. Appl. No. 11/523,830.
Restriction Requirement; Mail Date Apr. 27, 2009; U.S. Appl. No. 11/591,857.
Notice of Allowance; Mail Date Jun. 22, 2009; U.S. Appl. No. 11/586,826.
Notice of Allowance; Mail Date Dec. 14, 2009; U.S. Appl. No. 11/586,826.
Non Final Office Action; Mail Date Mar. 17, 2010; U.S. Appl. No. 11/592,819.
Notice of Allowance; Mail Date Jan. 19, 2010; U.S. Appl. No. 11/592,819.
Non Final Office Action; Mail Date Feb. 22, 2010; U.S. Appl. No. 11/586,825.
Non Final Office Action; Mail Date Aug. 19, 2009; U.S. Appl. No. 11/592,076.
Chaudhuri, "The impact of NACKs in shared memory scientific applications", Feb. 2004, IEEE, IEEE Transactions on Parallel and distributed systems vol. 15, No. 2, p. 134-150.
Laibinis, "Formal Development of Reactive Fault Tolerant Systems", Sep. 9, 2005, Springer, Second International Workshop, Rise 2005, p. 234-249.
Wikipedia, Memory Address, Oct. 29, 2010, pp. 1-4, www.wikipedia.com.
Wikipedia, Physical Address, Apr. 17, 2010, pp. 1-2, www.wikipedia.com.
Non-Final Office Action, Mailed May 11, 2010; U.S. Appl. No. 11/591,685.
Final Office Action, Mailed Oct. 27, 2010; U.S. Appl. No. 11/591,685.
Restriction, Mailed Apr. 28, 2009; U.S. Appl. No. 11/592,076.
Notice of Allowance, Mailed Jan. 29, 2010; U.S. Appl. No. 11/592,076.
Notice of Allowance, Mailed May 4, 2010; U.S. Appl. No. 11/592,076.
Notice of Allowance, Mailed Aug. 13, 2010; U.S. Appl. No. 11/592,076.
Notice of Allowance, Mailed Nov. 26, 2010; U.S. Appl. No. 11/592,076.
Notice of Restriction, Mailed Aug. 10, 2010; U.S. Appl. No. 12/650,068.
Final Office Action, Mailed Mar. 16, 2010; U.S. Appl. No. 11/523,830.
Notice of Allowance, Mailed Jun. 28, 2010; U.S. Appl. No. 11/523,830.
Notice of Allowance, Mailed Sep. 2, 2010; U.S. Appl. No. 11/523,830.
Notice of Allowance, Mailed Jan. 20, 2011; U.S. Appl. No. 11/523,830.

(56) References Cited

OTHER PUBLICATIONS

Notice of Allowance, Mailed May 5, 2011; U.S. Appl. No. 11/523,830.
Final Office Action, Mailed Aug. 1, 2010; U.S. Appl. No. 11/586,756.
Notice of Allowance, Mailed Dec. 27, 2010; U.S. Appl. No. 11/586,756.
Notice of Allowance, Mailed May 12, 2011; U.S. Appl. No. 11/586,756.
Office Action, Mailed Apr. 27, 2009; U.S. Appl. No. 11/591,857.
Non-Final Office Action, Mailed Dec. 7, 2010; U.S. Appl. No. 11/591,857.
Notice of Allowance, Mailed Mar. 18, 2011; U.S. Appl. No. 11/591,857.
Final Office Action, Mailed Jun. 25, 2010; U.S. Appl. No. 11/592,106.
Non-Final Office Action, Mailed Dec. 16, 2010; U.S. Appl. No. 11/592,106.
Non-Final Office Action, Mailed Sep. 19, 2008; U.S. Appl. No. 11/523,926.
Final Office Action, Mailed Apr. 10, 2009; U.S. Appl. No. 11/523,926.
Non-Final Office Action, Mailed Oct. 1, 2009; U.S. Appl. No. 11/523,926.
Notice of Allowance; Mailed Mar. 29, 2010; U.S. Appl. No. 11/523,926.
Notice of Allowance; Mailed Jul. 9, 2010; U.S. Appl. No. 11/523,926.
Notice of Allowance; Mailed Oct. 27, 2010; U.S. Appl. No. 11/523,926.
Notice of Allowance; Mailed Jul. 21, 2010; U.S. Appl. No. 11/523,950.
Notice of Allowance; Mailed Nov. 3, 2010; U.S. Appl. No. 11/523,950.
Notice of Allowance, Mailed Jun. 22, 2009; U.S. Appl. No. 11/586,826.
Notice of Allowance, Mailed Dec. 14, 2009; U.S. Appl. No. 11/586,826.
Notice of Allowance; Mailed Oct. 16, 2009; U.S. Appl. No. 11/592,819.
Non-Final Office Action, Mailed Mar. 17, 2010; U.S. Appl. No. 11/592,819.
Notice of Allowance; Mailed Nov. 23, 2010; U.S. Appl. No. 11/592,819.
Non-Final Office Action, Mailed Apr. 28, 2010; U.S. Appl. No. 11/592,780.
Non-Final Office Action, Mailed Oct. 13, 2010; U.S. Appl. No. 11/592,780.
Final Office Action, Mailed Apr. 27, 2010; U.S. Appl. No. 11/588,177.
Non-Final Office Action, Mailed Apr. 27, 2010; U.S. Appl. No. 11/591,856.
Notice of Allowance, Mailed Nov. 12, 2010; U.S. Appl. No. 11/591,856.
Notice of Allowance, Mailed Mar. 9, 2011; U.S. Appl. No. 11/591,856.
Non-Final Office Action, Mailed Feb. 22, 2010; U.S. Appl. No. 11/586,825.
Notice of Allowance, Mailed Aug. 16, 2010; U.S. Appl. No. 11/586,825.
Notice of Allowance, Mailed Nov. 26, 2010; U.S. Appl. No. 11/586,825.
Notice of Allowance, Mailed Mar. 4, 2011; U.S. Appl. No. 11/586,825.
Guelfi et al., (Rapid Integration of Software Engineering Techniques) 2005, Second International Workshop, 9 pages.
Non-Final Office Action Dated May 6, 2011; U.S. Appl. No. 11/591,685.
Final Office Action Dated Nov. 16, 2011; U.S. Appl. No. 11/591,685.
Notice of Allowance Dated Feb. 22, 2012; U.S. Appl. No. 11/591,685.
Notice of Allowance Dated May 30, 2012; U.S. Appl. No. 11/591,685.
Notice of Allowance Dated Mar. 17, 2011; U.S. Appl. No. 11/592,076.
Notice of Allowance Dated Jun. 29, 2011; U.S. Appl. No. 11/592,076.
Notice of Allowance Dated Oct. 14, 2011; U.S. Appl. No. 11/592,076.
Notice of Allowance Dated Jan. 27, 2012; U.S. Appl. No. 11/592,076.
Notice of Allowance Dated May 10, 2012; U.S. Appl. No. 11/592,076.
Non-Final Office Action Dated Feb. 1, 2011; U.S. Appl. No. 12/650,068.
Final Office Action Dated Aug. 9, 2011; U.S. Appl. No. 12/650,068.
Non-Final Office Action Dated Nov. 16, 2011; U.S. Appl. No. 12/650,068.
Notice of Allowance Dated May 1, 2012; U.S. Appl. No. 12/650,068.
Notice of Allowance Dated Jul. 6, 2012; U.S. Appl. No. 12/650,068.
Notice of Allowance Dated Jul. 21, 2011; U.S. Appl. No. 11/523,830.
Notice of Allowance Dated Oct. 26, 2011; U.S. Appl. No. 11/523,830.
Notice of Allowance Dated Feb. 2, 2012; U.S. Appl. No. 11/523,830.
Notice of Allowance Dated May 10, 2012; U.S. Appl. No. 11/523,830.
Notice of Allowance Dated Aug. 25, 2011; U.S. Appl. No. 11/586,756.
Notice of Allowance Dated Jan. 13, 2012; U.S. Appl. No. 11/586,756.
Notice of Allowance Dated May 15, 2012; U.S. Appl. No. 11/586,756.
Final Office Action Dated May 4, 2010; U.S. Appl. No. 11/591,857.
Notice of Allowance Dated Jul. 21, 2011; U.S. Appl. No. 11/591,857.
Notice of Allowance Dated Oct. 28, 2011; U.S. Appl. No. 11/591,857.
Notice of Allowance Dated Feb. 10, 2012; U.S. Appl. No. 11/591,857.
Notice of Allowance Dated May 25, 2012; U.S. Appl. No. 11/591,857.
Notice of Allowance Dated Feb. 3, 2011; U.S. Appl. No. 11/523,926.
Notice of Allowance Dated May 23, 2011; U.S. Appl. No. 11/523,926.
Notice of Allowance Dated Aug. 23, 2011; U.S. Appl. No. 11/523,926.
Notice of Allowance Dated Oct. 28, 2011; U.S. Appl. No. 11/523,926.
Notice of Allowance Dated Feb. 24, 2011; U.S. Appl. No. 11/523,926.
Notice of Allowance Dated Jun. 1, 2012; U.S. Appl. No. 11/523,926.
Notice of Allowance Dated Jun. 9, 2011; U.S. Appl. No. 11/523,950.
Notice of Allowance Dated Aug. 30, 2011; U.S. Appl. No. 11/523,950.
Notice of Allowance Dated Nov. 14, 2011; U.S. Appl. No. 11/523,950.
Notice of Allowance Dated Feb. 16, 2011; U.S. Appl. No. 11/586,826.
Notice of Allowance Dated Jul. 26, 2011; U.S. Appl. No. 11/586,826.
Notice of Allowance Dated Dec. 27, 2011; U.S. Appl. No. 11/586,826.
Notice of Allowance Dated Jul. 5, 2012; U.S. Appl. No. 11/586,826.
Notice of Allowance Dated Apr. 19, 2011; U.S. Appl. No. 11/592,819.
Notice of Allowance Dated Sep. 7, 2011; U.S. Appl. No. 11/592,819.
Notice of Allowance Dated Dec. 9, 2011; U.S. Appl. No. 11/592,819.
Notice of Allowance Dated Jun. 7, 2012; U.S. Appl. No. 11/592,819.
Final Office Action Dated Apr. 12, 2011; U.S. Appl. No. 11/592,780.
Non-Final Office Action Dated Nov. 1, 2011; U.S. Appl. No. 11/592,780.
Final Office Action Dated May 7, 2012; U.S. Appl. No. 11/592,780.
Non-Final Office Action Dated Jun. 7, 2011; U.S. Appl. No. 11/588,177.
Final Office Action Dated Nov. 29, 2011; U.S. Appl. No. 11/588,177.
Notice of Allowance Dated Jun. 17, 2011; U.S. Appl. No. 11/591,856.

(56) References Cited

OTHER PUBLICATIONS

Notice of Allowance Dated Sep. 26, 2011; U.S. Appl. No. 11/591,856.
Notice of Allowance Dated Jan. 5, 2012; U.S. Appl. No. 11/591,856.
Notice of Allowance Dated Apr. 12, 2012; U.S. Appl. No. 11/591,856.
Notice of Allowance Dated Jun. 7, 2012; U.S. Appl. No. 11/591,856.
Notice of Allowance Dated Jun. 16, 2011; U.S. Appl. No. 11/586,825.
Notice of Allowance Dated Aug. 9, 2011; U.S. Appl. No. 11/586,825.
Notice of Allowance Dated Dec. 8, 2011; U.S. Appl. No. 11/586,825.
Notice of Allowance Dated Mar. 21, 2012; U.S. Appl. No. 11/586,825.
Notice of Allowance Dated Jul. 6, 2012; U.S. Appl. No. 11/586,825.
Final Office Action Dated Jul. 5, 2011; U.S. Appl. No. 11/592,106.
Non-Final Office Action Dated Dec. 2, 2011; U.S. Appl. No. 11/592,106.
Final Office Action Dated May 10, 2012; U.S. Appl. No. 11/592,106.
Wikipedia, (CPU Cache Definition), www.wikipedia.com, pp. 1-16, Jan. 26, 2010.
Glasco, et al. Notice of Allowance Dated Sep. 26, 2012; U.S. Appl. No. 11/591,685; All Pages.
Glasco, et al. Notice of Allowance Dated Jan. 14, 2013; U.S. Appl. No. 11/591,685; All Pages.
Glasco, et al. Notice of Allowance Dated Aug. 16, 2012; U.S. Appl. No. 11/592,076; All Pages.
Glasco, et al. Notice of Allowance Dated Sep. 17, 2012; U.S. Appl. No. 12/650,068; All Pages.
Glasco, et al. Notice of Allowance Dated Jan. 28, 2013; U.S. Appl. No. 12/650,068; All Pages.
Glasco, et al. Notice of Allowance Dated Aug. 29, 2012; U.S. Appl. No. 11/523,830; All Pages.
Glasco, et al. Notice of Allowance Dated Nov. 20, 2012; U.S. Appl. No. 11/586,756; All Pages.
Glasco, et al. Notice of Allowance Dated Feb. 20, 2013; U.S. Appl. No. 11/586,756; All Pages.
Glasco, et al. Notice of Allowance Dated Sep. 18, 2012; U.S. Appl. No. 11/591,857; All Pages.
Glasco, et al. Notice of Allowance Dated Dec. 31, 2012; U.S. Appl. No. 11/591,857; All Pages.
Glasco, et al. Notice of Allowance Dated Feb. 1, 2013; U.S. Appl. No. 11/591,857; All Pages
Glasco, et al. Office Action Dated Jan. 13, 2013; U.S. Appl. No. 11/592,106; All Pages.
Glasco, et al. Notice of Allowance Dated Feb. 24, 2012; U.S. Appl. No. 11/523,926; All Pages.
Glasco, et al. Notice of Allowance Dated Sep. 12, 2012; U.S. Appl. No. 11/523,926; All Pages.
Glasco, et al. Notice of Allowance Dated Apr. 2, 2013; U.S. Appl. No. 11/523,950; All Pages.
Glasco, et al. Notice of Allowance Dated Feb. 7, 2013; U.S. Appl. No. 11/586,826; All Pages.
Glasco, et al. Notice of Allowance Dated Oct. 5, 2012; U.S. Appl. No. 11/592,819; All Pages.
Glasco, et al. Notice of Allowance Dated Jan. 24, 2013 U.S. Appl. No. 11/592,819; All Pages.
Glasco, et al. Notice of Allowance Dated Sep. 14, 2012; U.S. Appl. No. 11/588,177; All Pages.
Glasco, et al. Notice of Allowance Dated Mar. 18, 2013; U.S. Appl. No. 11/588,177; All Pages.
Glasco, et al. Notice of Allowance Dated Sep. 17, 2012; U.S. Appl. No. 11/591,856; All Pages.
Glasco, et al. Notice of Allowance Dated Jan. 17, 2013; U.S. Appl. No. 11/591,856; All Pages.
Glasco, et al. Notice of Allowance Dated Oct. 12, 2012; U.S. Appl. No. 11/586,825; All Pages.
Harper et al., (Rapid recovery from transient Faults in the fault tolerant processor with fault-tolerant shared memory) 1990, IEEE, pp. 350-359.
Ooi, (Fault Tolerant Architecture in a cache memory control LSI), 1992, IEEE, 507-514.
Oracle, (Oracle 8i Parallel server), 1999, Oracle, Release 2 (8.1.6) 1-216.
Shalan. (Dynamic Memory Management for embedded real-time multiprocessor system on a chip), 2000, ACM. 180-186.
Shalan. (Dynamic Memory Management for embedded real-time multiprocessor system on a chip), 2003, Georgia Inst. Of Tech. 1-118.
Notice of Allowance dated May 8, 2013; U.S. Appl. No. 11/591,685.
Notice of Allowance dated May 10, 2013; U.S. Appl. No. 12/650,068.
Notice of Allowance dated May 23, 2013; U.S. Appl. No. 11/591,857.
Final Office Action dated Jun. 6, 2013; U.S. Appl. No. 11/592,106.
Notice of Allowance dated May 16, 2013; U.S. Appl. No. 11/523,950.
Notice of Allowance dated May 8, 2013; U.S. Appl. No. 11/592,819.
Notice of Allowance dated Apr. 30, 2013; U.S. Appl. No. 11/591,856.
Page Fault; http://en.wikipedia.org/wiki/Page_fault. From Wikpedia, the free encyclopedia; Mar. 2009: 4 Pages.
Definition of: page fault; PCMAG.COM; http://www.pcmag.com/encyclopedia; Mar. 2009; 2 Pages.
Notice of Allowance Dated Aug. 1, 2013; U.S. Appl. No. 11/591,685.
Notice of Allowance Dated Jul. 29, 2013; U.S. Appl. No. 12/650,068.
Notice of Allowance Dated Jul. 18, 2013; U.S. Appl. No. 11/586,756.
Non-Final Office Action Dated Oct. 3, 2013; U.S. Appl. No. 11/592,106.
Notice of Allowance Dated Aug. 26, 2013; U.S. Appl. No. 11/586,826.
Notice of Allowance Dated Aug. 1, 2013; U.S. Appl. No. 11/592,819.
Non-Final Office Action Dated Sep. 10, 2013; U.S. Appl. No. 11/592,780.
Notice of Allowance Dated Sep. 12, 2013; U.S. Appl. No. 11/588,177.

\* cited by examiner

410
Receiving a plurality of access requests from a plurality of engines.

420
Encountering an invalidation triggering event associated with a first one of said plurality of engine.

430
Handling the invalidation trigger indication independently.

440
Proceeding with translation of said plurality of access requests independently.

SYSTEM AND METHOD FOR INDEPENDENT INVALIDATION ON A PER ENGINE BASIS

FIELD OF THE INVENTION

The present invention relates to the field of information processing. In particular, the present invention relates to a system and method for shared resource access management.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. Electronic systems providing these advantageous results often include shared resources. However, designing and building systems that efficiently access and utilize a shared resource is often challenging. Coordinating the access to shared resources can be highly complex and resource intensive.

Memory or storage is usually a very important component of a number of systems. Memories typically store information utilized by a system in performance of a number of different tasks. Other components of a system typically request access to a memory in order to retrieve (e.g., "read") information from or forward (e.g., "write') information to the memory. Different types of memories (e.g., bulk storage, main memory, removable memory etc.) and or memory "spaces" (e.g., virtual, physical, etc.) can be utilized to support information storage.

Different types of memory can potentially offer different features. For example, different types of memories typically have different relative storage capacities and relatively different access speeds. Traditionally, systems that have relatively large storage capacity have relatively slow access speeds and systems that have relatively fast access speeds have relatively small storage capacities. For example, main system memories are relatively fast compared to bulk storage memories but typically store less information. A number of systems transfer chunks of information between relatively fast small memories and relatively slow bulk memories in an attempt to optimize speed and capacity.

Traditional computer systems also often run programs that utilize virtual memory space addressing. Typically the computer system performs a translation or mapping between the virtual memory space addressing and physical memory space addressing. The translation or mapping usually involves swapping in and out and aligning blocks of information between relatively faster and smaller memories and larger memories or bulk storage. When a program wishes to access a virtual address whose corresponding information is not located in the smaller memory the system retrieves the information from a larger memory or bulk storage. Coordinating the retrieval when information is not resident in the faster memories can be rather complicated and time consuming as processes wait for the information to be retrieved.

SUMMARY

A shared resource management system and method are described. In one embodiment a shared resource management system includes a plurality of engines, a shared resource, and a shared resource management unit. In one exemplary implementation the shared resource is a memory and the shared resource management unit is a memory management unit (MMU). The plurality of engines perform processing. The shared resource supports the processing. For example, a memory stores information and instructions for the engines. The shared resource management unit manages memory operations including independently invalidating page table entries on a per engine basis.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

Figure 1:
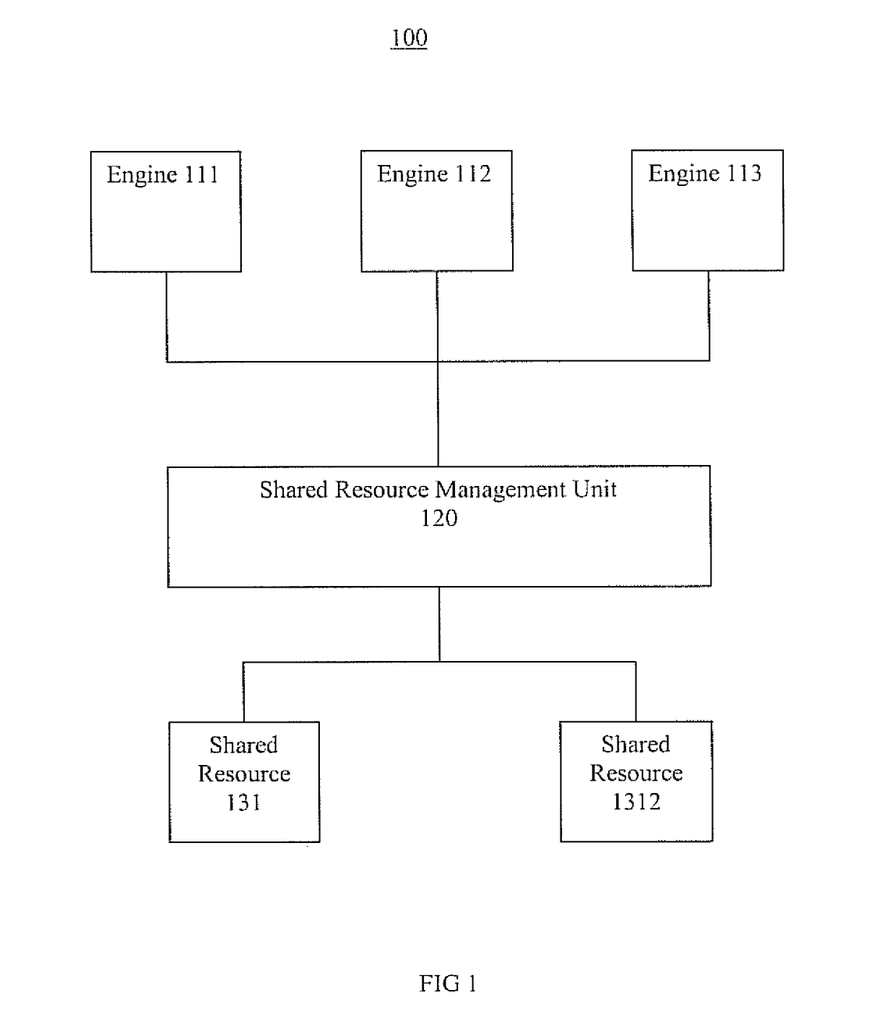
FIG. 1 is a block diagram of an exemplary shared resource management system in accordance with one embodiment of the present invention.

FIG. 1 is a block diagram of an exemplary shared resource management system 100 in accordance with one embodiment of the present invention. Exemplary shared resource management system 100 includes engine 111, engine 112, engine 113, shared resource management unit 120 and shared resource 130. Engine 111, engine 112, and engine 113 are communicatively coupled to shared resource management unit 120 which in turn is communicatively coupled to shared resource 130.

The components of exemplary shared resource management system 100 cooperatively operate to facilitate efficient management of access to a shared resource by a plurality of engines. Engine 111, engine 112 and engine 113 perform various processing activities. In one embodiment, each engine can perform processing activities for a variety of clients. Shared resource 130 supports the processing by engines 111, 112 and 113. In one exemplary implementation, shared resource 130 is a memory for storing information utilized by engines 111, 112, and/or 113. Shared resource management unit 120 unit manages virtualization of memory including independently mapping, invalidating and changing information in shared resource 130 on a per engine basis.

By managing the virtualization of memory including independently invalidating and changing mapping information associated with shared resource 130, shared resource management system 100 facilitates efficient updating of share resource 130. For example, if information in shared resource 130 associated with a particular engine is being altered, shared resource management unit 120 coordinates invalidation of the mapping information on a per engine basis. Shared resource management unit 120 can permit other engines to access the shared resource 130 even while updating mapping information associated with a particular engine. In one embodiment, the shared resource management unit 120 handles a plurality of contexts.

Figure 2:
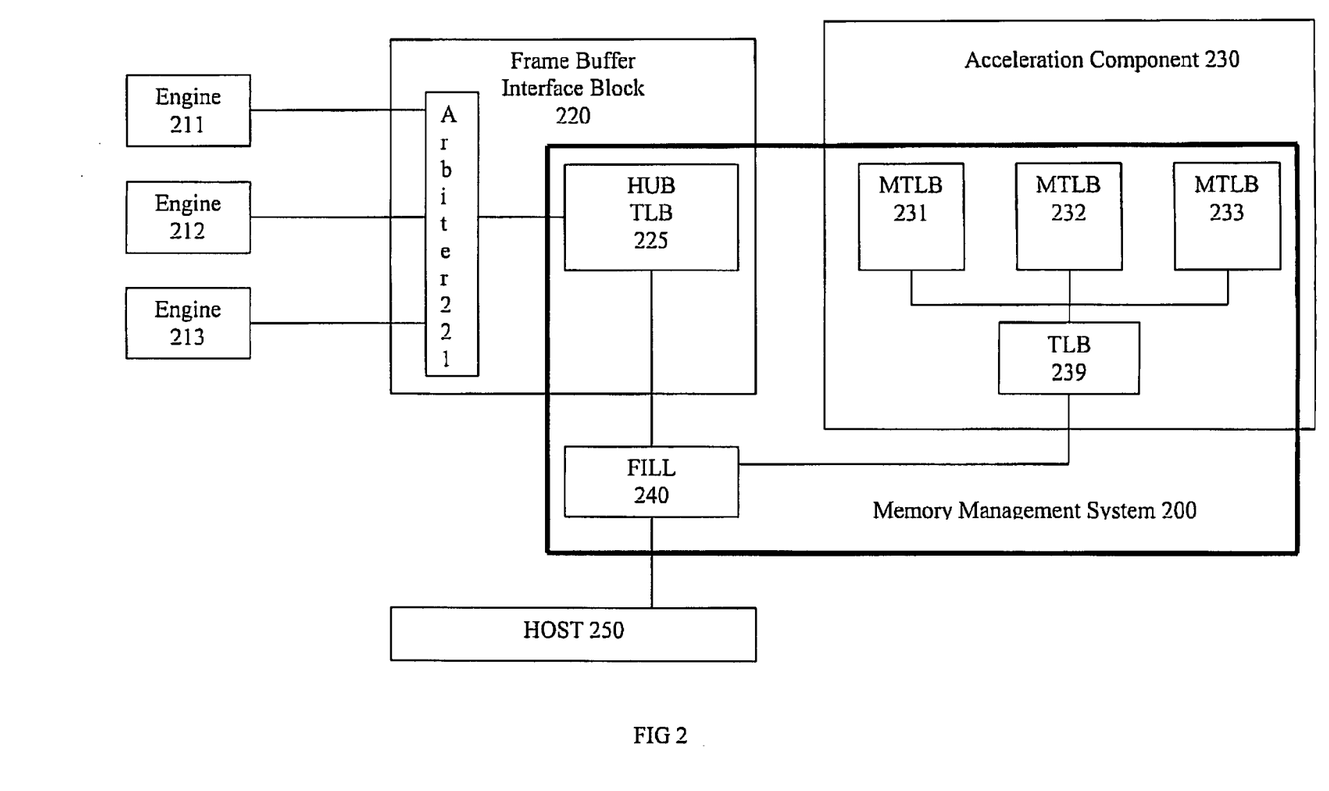
FIG. 2 is a block diagram of an exemplary memory management system in accordance with one embodiment of the present invention

FIG. 2 is a block diagram of exemplary memory management system 200, in accordance with one embodiment of the present invention. In one exemplary implementation, memory management system 200 is referred to as a memory management unit (MMU). Memory management system 200 facilitates efficient memory access. Memory management system 200 includes shared translation buffers (e.g., hub translation buffer TLB 225 and TLB 239), dedicated micro translation buffers (e.g., TLBs 231, 232 and 233) and fill component 240. Shared translation buffers and dedicated micro translation buffers translate virtual addresses to physical addresses. Fill component 240 coordinates memory accesses and mapping efficiently and independently, including translation lookaside buffer invalidation and fetches page table entry information for the translation lookaside buffer (e.g., on TLB misses). If there is a miss in the translation (e.g., information is not stored in a current cache location) a notification is sent to the fill component 240. The fill component 240 puts together a memory request packet and forwards it to a frame buffer to retrieve translation data. In one exemplary implementation, the fill component 240 can put together memory request packets associated with page table entries for translating between virtual and physical memory spaces.

In one embodiment, memory management unit 200 manages information storage virtualization for the plurality of engines concurrently, including concurrent memory access translations. In one exemplary implementation, the memory management unit tracks an identifier for associating information stored in a TLB to each of the plurality of engines making a memory access request. The memory management unit associates each of the plurality of engines with particular translation information respectively. In one embodiment, the translation information is stored in a portion of instance memory. Memory management unit 200 can be non-blocking. Memory management unit 200 can also permit a hit under miss.

In one embodiment, a memory management unit (e.g., memory management unit 200) independently invalidates page table entries on a per engine basis. For example the memory management unit allows page table entries associated with a second one of the plurality of engines to remain valid even if page table entries associated with a first one of the plurality of engines are invalidated. In one exemplary implementation, modules not associated with a first one of the plurality of engines are not reloaded in response to an invalidation of page table entries associated with the first one of the plurality of engines.

The memory management unit (e.g., memory management unit 200) invalidates page table entries associated with a first one of the plurality of engines in response to a context switch associated with the first one of the plurality of engines while a page table entry associated with a second one of the plurality of engines remains valid. In one exemplary implementation, the page table mapping is dynamically altered.

In one embodiment, memory management system 200 is included in a graphics system. The graphics system includes engine 211, engine 212, and engine 213, buffer interface block 220, acceleration component 230, fill component 240 and host 250. In one embodiment, the acceleration component 230 is dedicated to serving the graphics engine. Engine 211, engine 212, and engine 213, are communicatively coupled to frame buffer interface block 220, which is communicatively coupled to fill component 240. Fill component 230 in turn is communicatively coupled to acceleration component 230 and host 250.

The components of the graphics system cooperatively operate to perform graphics processing memory accesses. Engines 211, 212 and 213 process graphics information. Frame buffer interface block 220 enables efficient and independent access to a frame buffer. Arbiter 221 selectively arbitrates access requests from engines 211, 212, and 213 and forwards selected access requests to Hub TLB 225. Hub TLB 225 translates between virtual addresses and physical addresses. Acceleration component 230 enables accelerated processing of graphics information. In one embodiment, MTLBs 231, 232 and 233 handle translations between virtual and physical memory spaces in a level 1 cache and TLB 239 handles memory translations between virtual and physical memory spaces in a level 2 cache. Fill component 240 coordinates retrieval of translation data, including fetching page table entry information for translation lookaside buffers. Host 250 issues interrupts including interrupts for handling memory access faults.

Figure 3:
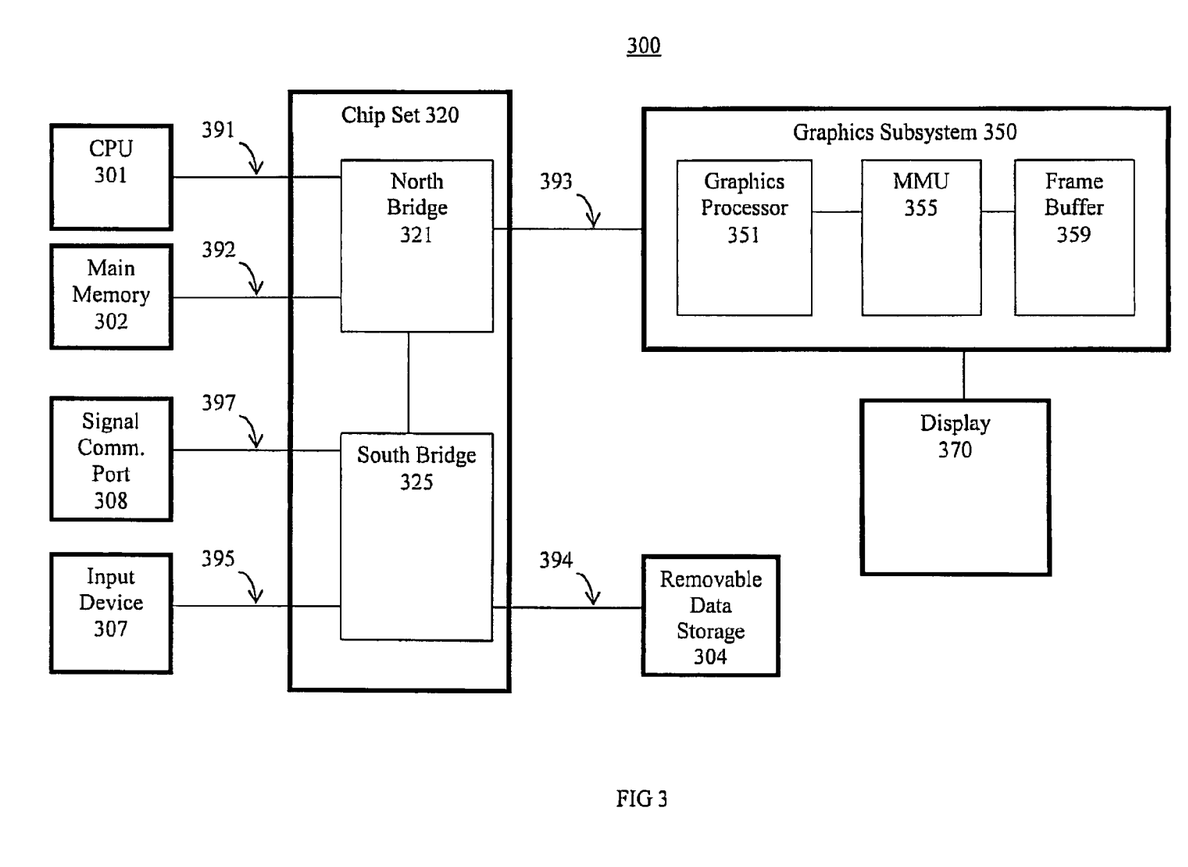
FIG. 3 is a block diagram of a computer system, one embodiment of a computer system upon which embodiments of the present invention can be implemented.

FIG. 3 is a block diagram of a computer system 300, one embodiment of a computer system upon which embodiments of the present invention can be implemented. Computer system 300 includes central processor unit 301, main memory 302 (e.g., random access memory), chip set 320 with north bridge 321 and south bridge 325, removable data storage device 304, input device 307, signal communications port 308, and graphics subsystem 350 which is coupled to display 370. Computer system 300 includes several busses for communicatively coupling the components of computer system 300. Communication bus 391 (e.g., a front side bus) couples north bridge 321 of chipset 320 to central processor unit 301. Communication bus 392 (e.g., a main memory bus) couples north bridge 321 of chipset 320 to main memory 302. Communication bus 393 (e.g., the Advanced Graphics Port interface) couples north bridge of chipset 320 to graphic subsystem 350. Communication buses 394-397 (e.g., a PCI bus) couple south bridge 325 of chip set 320 to removable data storage device 304, input device 307, signal communications port 308 respectively. Graphics subsystem 350 includes graphics processor 351, memory management unit 355 and graphics buffer 359.

The components of computer system 300 cooperatively operate to perform a variety of processing tasks and facilitate efficient memory accesses. Communications bus 391, 392, 393, 394, 395 and 397 communicate information. Central processor 301 processes information. Main memory 302 stores information and instructions for the central processor 301. Removable data storage device 304 also stores information and instructions (e.g., functioning as a large information reservoir). Input device 307 provides a mechanism for inputting information and/or for pointing to or highlighting information on display 370. Signal communication port 308 provides a communication interface to exterior devices (e.g., an interface with a network). Display device 370 displays information in accordance with data stored in frame buffer 359. Graphics processor 351 processes graphics commands from central processor 301 and provides the resulting data to graphics buffers 359 for storage and retrieval by display monitor 370. Memory management unit 355 handles the memory access requests between graphics processor 351 and graphics buffers 359. In one embodiment, memory management unit 355 is similar to memory management unit 200. It is appreciated that similar memory management units can be implemented to facilitate efficient and independent access requests to other memory components of computer system 300, including main memory 302 and bulk data storage 304.

It is appreciated that the present invention can be implemented in a variety of embodiments. In one exemplary implementation the present invention can be utilized in processing systems utilized to provide a variety of graphics applications including video games. For example, the present invention can be utilized to facilitate virtual to physical address translations in a game console, personal computer, personal digital assistant, cell phone or any number of platforms for implementing a video game. It is also appreciated that references to video game application implementations are exemplary and the present invention is not limited to these implementations.

Figure 4:
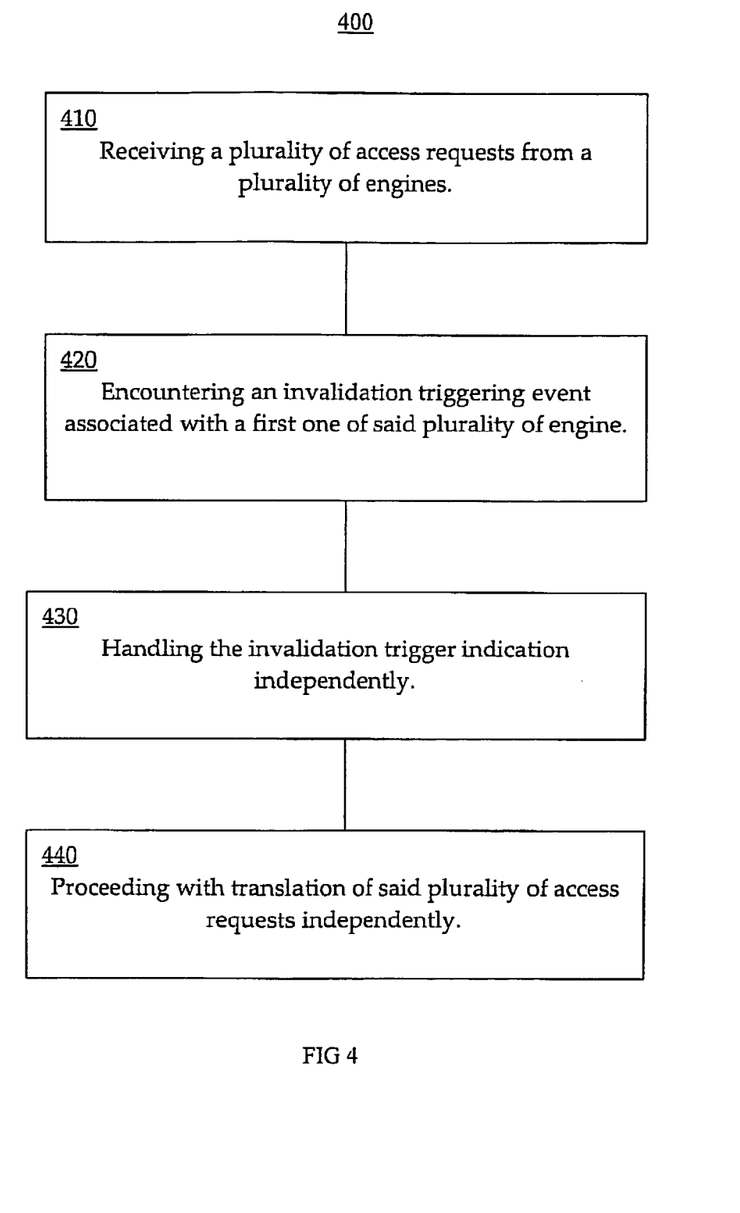
FIG. 4 is a flow chart of an exemplary memory management method in accordance with one embodiment of the present invention.

FIG. 4 is a flow chart of an exemplary memory management method 400 in accordance with one embodiment of the present invention. Memory management method 400 facilitates efficient and independent invalidation on a per engine basis.

At block 410, a plurality of access requests are received. In one embodiment, the plurality of access requests are from a plurality of clients. It is appreciated the access requests can be directed to various MMU units. In one embodiment, level 1 translation cache memory units (e.g., micro TLB, Hub TLB, etc.) receive access requests and after MMU translation the request has an aperture field which notifies a frame buffer interface which destination the request should be forwarded to (e.g., frame buffer memory, dedicated memory, main system memory, etc.). One of the pluralities of access requests can be from a first engine and another one of the plurality of access requests can be from a second engine.

At block 420, an invalidation triggering event is encountered. In one embodiment, the invalidation triggering event is associated with a first engine. In one embodiment the invalidation triggering indication is associated with a context swap. The invalidation triggering indication can also be associated with operating system changes to the page table entries. In one exemplary implementation, a range of cache addresses is specified for an invalidation.

At block 430, the invalidation trigger indication is handled independently. In one embodiment, handling the invalidation trigger indication includes swapping out page table entries (e.g., by software, an operating system, etc.0 associated with a first one of the plurality of engines without invalidating other page table entries associated with a second one of the plurality of engines. In one exemplary implementation, the swapping out also includes examining a translation lookaside buffer and invalidating entries associated with the first one of the plurality of engines. The first engine can be restarted independently after the invalidation.

At block 440, translation of the plurality of access requests proceeds independently. In one embodiment, processing of a second one of the plurality of access requests proceeds while handling the invalidation associated with the first one of the plurality of access requests. For example, the plurality of access requests from a second engine is proceeded with independently. In one embodiment, processing of a second one of the plurality of access requests from a second engine continues while handling a fault associated with the first one of the plurality of access requests.

Figure 5:
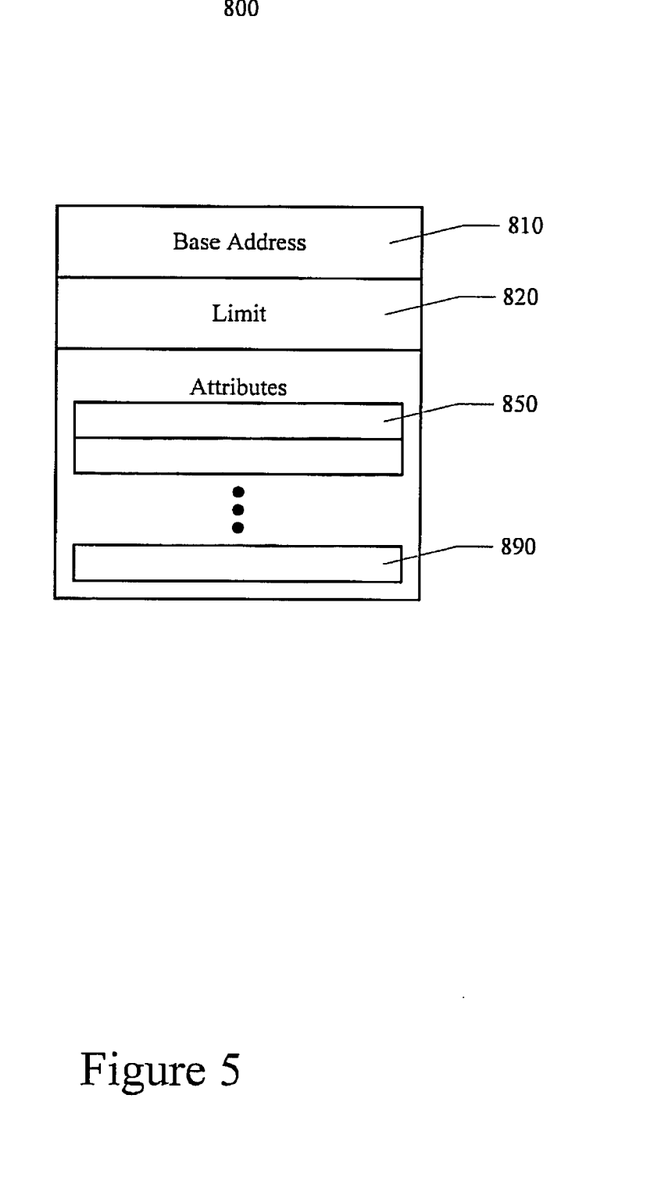
FIG. 5 is a block diagram illustration of an exemplary context specifier in accordance with one embodiment of the present invention.

Referring now to FIG. 5, a block diagram illustration of a context specifier 800, in accordance with one embodiment of the present invention, is shown. The context specifier 800 is a data structure that stores a base address 810, a limit 820, and one or more attributes 850, 890, etc. The attributes can be utilized to indicate a number of the present invention features, including identifying an engine associated with a page entry. The indicator may be stored in one or more bits and the adjustments may be stored as a plurality of bits.

Figure 6:
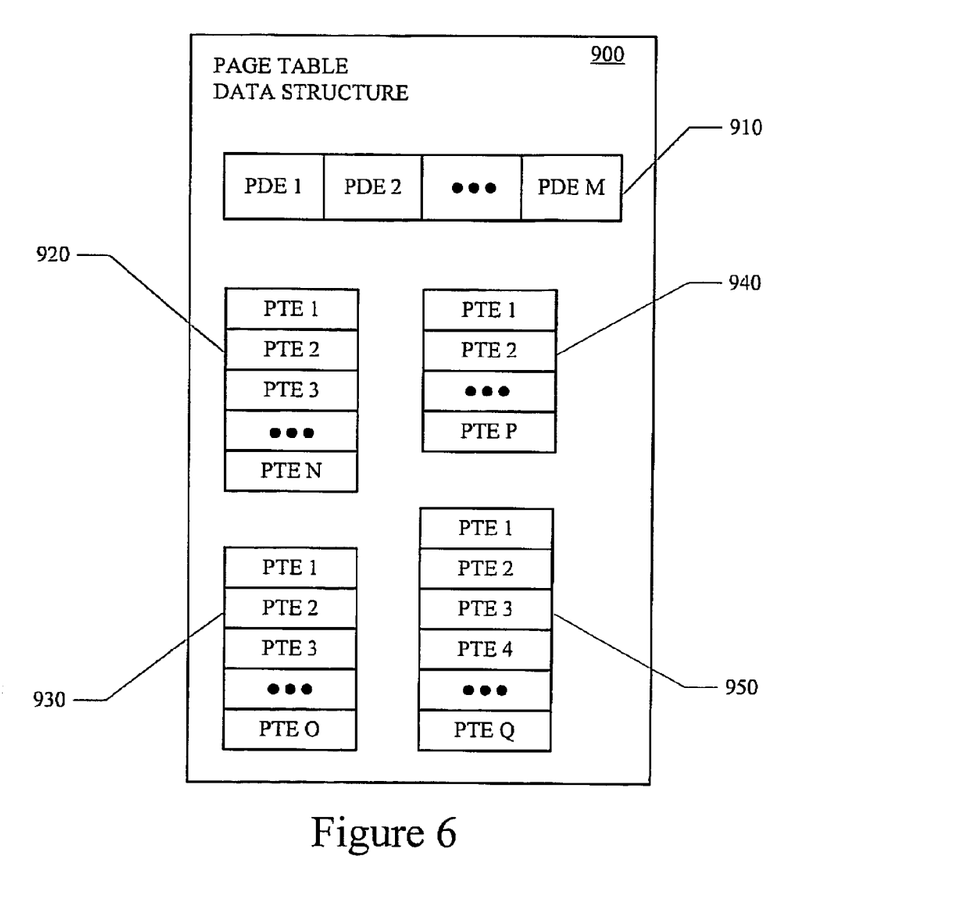
FIG. 6 is a block diagram of an exemplary page table data structure in accordance with one embodiment of the present invention.

FIG. 6 is a block diagram of an exemplary page table data structure 900 in accordance with one embodiment of the present invention. The illustrated two-level page table data structure 900 may include a page directory 910 and one or more page tables 920-950. The page directory 910 includes a plurality of page directory entries (PDE). Each PDE includes the address of a corresponding page table 920-950. Each PDE may also include a plurality of attributes. Each page table 920-950 includes one or more page table entries (PTE). Each PTE includes a corresponding frame number (e.g., physical page number). Each PTE may also include a plurality of attributes such as a dirty bit, an accessed bit, a page check disable bit, a page write transparent bit, a user accessible bit, a writeable bit, a present bit, a referenced bit, a hash function identification bit, a valid bit, an address compare bit, a changed bit, storage control bits, a no execute bit, page protection bits and/or the like. One or more of the attributes in the PDE and/or PTE may be the same attributes contained in the context specifier 800. For example, in one implementation, the attributes in the context specifier includes all of the attributes in the PTEs.

Figure 7:
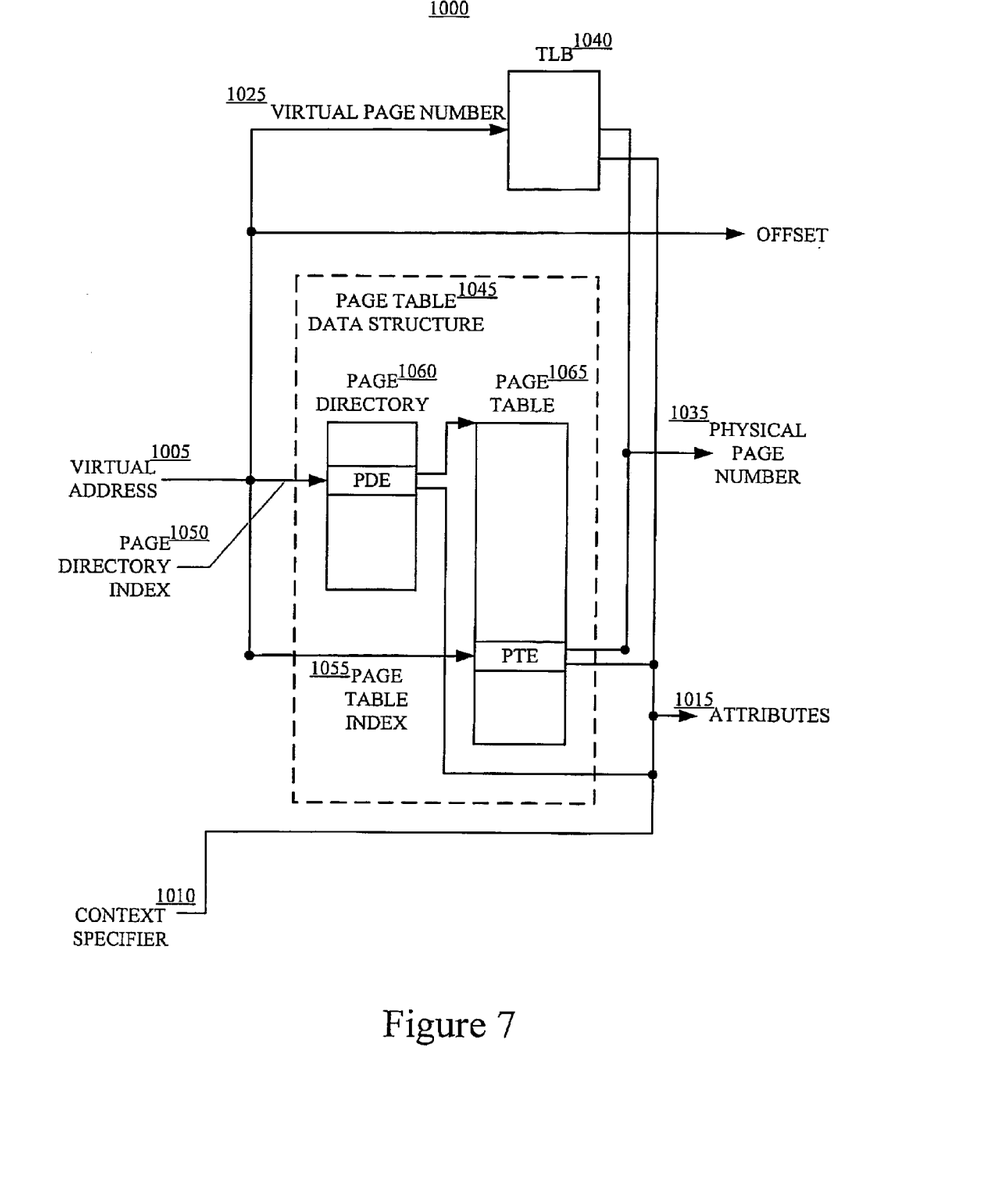
FIG. 7 is a block diagram of an exemplary system for translating virtual addresses to physical addresses in accordance with one embodiment of the present invention.

With reference now to FIG. 7, a block diagram of an exemplary system for translating virtual addresses to physical addresses in accordance with one embodiment of the present invention is shown. In one exemplary implementation, a virtual address 1005 and a context specifier 1010 are received. The context specifier 1010 includes one or more attributes 1015. The virtual address 1005 includes a virtual page number.

In one exemplary implementation, the virtual address 1050 is translated using a page table data structure 1045 which may be cached in TLB 1040. In particular, if a TLB 1040 includes a valid virtual-to-physical page mapping for the virtual page number 1025 (e.g., TLB hit) the appropriate physical page number 1035 is output from the TLB 1040. When the virtual page number 1025 is mapped to a given physical page number 1035 using the TLB 1040, the attributes used in the address translation process and/or output for use in accessing the memory may use attributes 1015 contained in the TLB 1040 or attributes of the context specifier 1010.

However, if the TLB 1040 does not include a valid mapping (e.g., TLB miss), the virtual address 1005 is translated using a page table data structure 1045. More specifically, the virtual page number 1025 includes a page directory index 1050 and a page table index 1055. The page directory index 1050 in the virtual address 1005 is used to index a given page directory 1060. The page directory entry (PDE) indexed by the page directory index 1050 includes an address of a given page table 1065. The page table index 1055 in the virtual address 1005 is used to index the given page table 1065 located at the address specified in the PDE. The page table entry (PTE) indexed by the page table index 1055 includes the physical page number 1035. When the virtual page number is translated to a given physical page number 1035 using the page table data structure 1045, the attributes 1015 used in the address translation process and/or output for use in accessing the memory may be attributes 1015 specified in the given PDE and/or PTE, or attributes 1015 of the context specifier 1010.

In one embodiment, the present invention includes a page table entry override capability. If the page table entry override capability is engaged an adjustment in the attributes of a context specifier is utilized in determining the physical page number.

It is appreciated, embodiments of the present invention can facilitate virtual address translation to physical addresses of information located in a variety of memory types including, a frame buffer memory, dedicated memory, main system memory, and etcetera.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A shared resource management system comprising:
a plurality of engines for performing processing;
a plurality of shared memory related resources for supporting said processing;
an interface that facilitates access to said plurality of shared memory related resources in response to requests for access thereto from two or more of said plurality of processing engines, wherein said interface includes an arbiter for selectively arbitrating said access requests from said plurality of processing engines; and
a shared resource management unit for managing memory virtualization and, upon encountering an invalidation triggering event associated with a first one of said plurality of processing engines, handling said invalidation triggering event independently and translating said plurality of memory access requests independently;
wherein as part of said translating, said memory access requests comprise an aperture field that notifies said interface in relation to which one of a plurality of memory address destinations said access request is forwarded to, and accesses to said shared memory related resources are coordinated independently in relation to which of said two or more processing engines originates said memory access requests and are non-blocking in relation to said memory access requests from at least a second one of said plurality of processing engines.

2. The shared resource management system of claim 1 wherein said shared resource management unit allows cached page table entries associated with a second one of said plurality of engines to remain valid in a translation lookaside buffer even if page table entries associated with a first one of said plurality of engines are invalidated in said translation lookaside buffer.

3. The shared resource management system of claim 1 wherein said shared resource is a memory.

4. The shared resource management system of claim 3 wherein modules not associated with a first one of said plurality of engines are not reloaded in response to an invalidation of page table entries associated with said first one of said plurality of engines.

5. The shared resource management system of claim 1 wherein said shared resource management unit invalidates cached page table entries associated with a first one of said plurality of engines in response to a context switch associated with said first one of said plurality of engines while page table entries associated with a second one of said plurality of engines remains valid.

6. The shared resource management system of claim 1 wherein association of said shared resource to said plurality of engines is dynamically altered.

7. A memory management method comprising:
receiving a plurality of requests for access to a shared memory resource from a plurality of processing engines;
encountering an invalidation triggering event associated with a first one of said plurality of processing engines;
handling said first processing engine associated invalidation triggering event independently, in relation to at least one of said memory resource access requests from at least a second one of said plurality of processing engines, with a shared resource management unit; and proceeding with translation of said plurality of access requests independently, in relation to which of said two or more processing engines originates said memory access requests, wherein as part of said translation, said memory resource access requests comprise an aperture field that notifies an interface which one of a plurality of memory address destinations said memory resource access request is forwarded to, and accesses to said shared memory resource are coordinated independently among the plurality of processing engines and are non-blocking in relation to said memory access requests from at least a second one of said plurality of processing engines.

8. The memory management method of claim 7 wherein said plurality of access requests are from a plurality of clients.

9. The memory management method of claim 7 wherein said handling said invalidation triggering event includes swapping out page table entries associated with said first one of said plurality of engines.

10. The memory management method of claim 9 wherein said swapping out includes examining a translation lookaside buffer and invalidating entries associated with said first one of said plurality of engines.

11. The memory management method of claim 10 wherein said invalidation triggering event is associated with a context swap.

12. The memory management method of claim 10 wherein said invalidation triggering event is associated with operating system changes to said page table entries.

13. The memory management method of claim 7 further comprising continuing to process a second one of said plurality of access requests from a second one of said plurality of engines while performing said handling of said invalidation triggering event, wherein said invalidation triggering events is associated with a first one of said plurality of access requests from a first one of said plurality of engines.

14. The memory management method of claim 7 further comprising recovering from an invalidation indication.

15. The memory management method of claim 7 further comprising specifying a virtual address range of a translation lookaside buffer cache to invalidate.

16. The memory management method of claim 7 wherein said access requests are directed to resources allocated on the fly.

17. A memory management component comprising:

a shared translation lookaside buffer for translating virtual addresses to physical addresses in a memory resource, which is shared by a plurality of processors, wherein said shared memory resource is accessed by each of said plurality of processors in response to respective requests for access to said shared memory resource from one or more of said plurality of processors; and a fill component for coordinating memory invalidations in response to one or more of a context switch or an invalidate request from a first one of said plurality of processors, wherein the coordinating of said context switch or said invalidate request is performed independently in relation to at least one request for access to said shared memory resource from at least a second one of said plurality of processors, wherein as part of said translating, said request for access to a shared memory resource comprises an aperture field that notifies an interface which one of a plurality of destinations in said shared memory resource said access request is forwarded to, wherein said fill component is non-blocking in relation to said shared memory resource access requests from said at least a second one of said plurality of processing engines.

18. The memory management component of claim 17 wherein a portion of page table entries cached in said translation lookaside buffer associated with an engine are invalidated.

19. The memory management component of claim 17 wherein said shared translation buffer is a hub translation buffer.

20. The memory management component of claim 17 wherein said translating said virtual addresses to physical addresses is associated with graphics operations.

* * * * *